Jan. 9, 1951 T. E. SMITH 2,537,649
TIRE-BUILDING APPARATUS
Filed Sept. 2, 1948 6 Sheets-Sheet 3

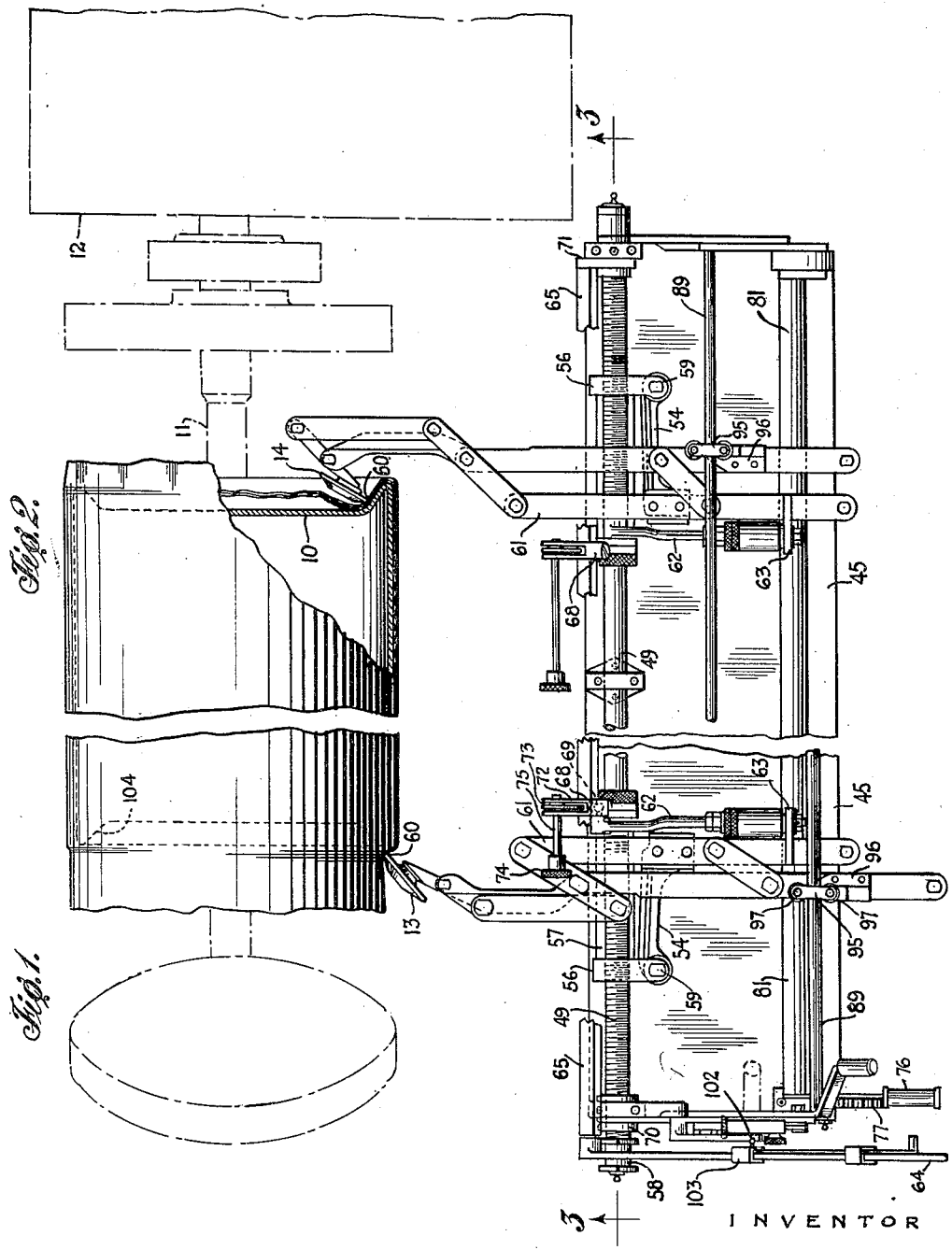

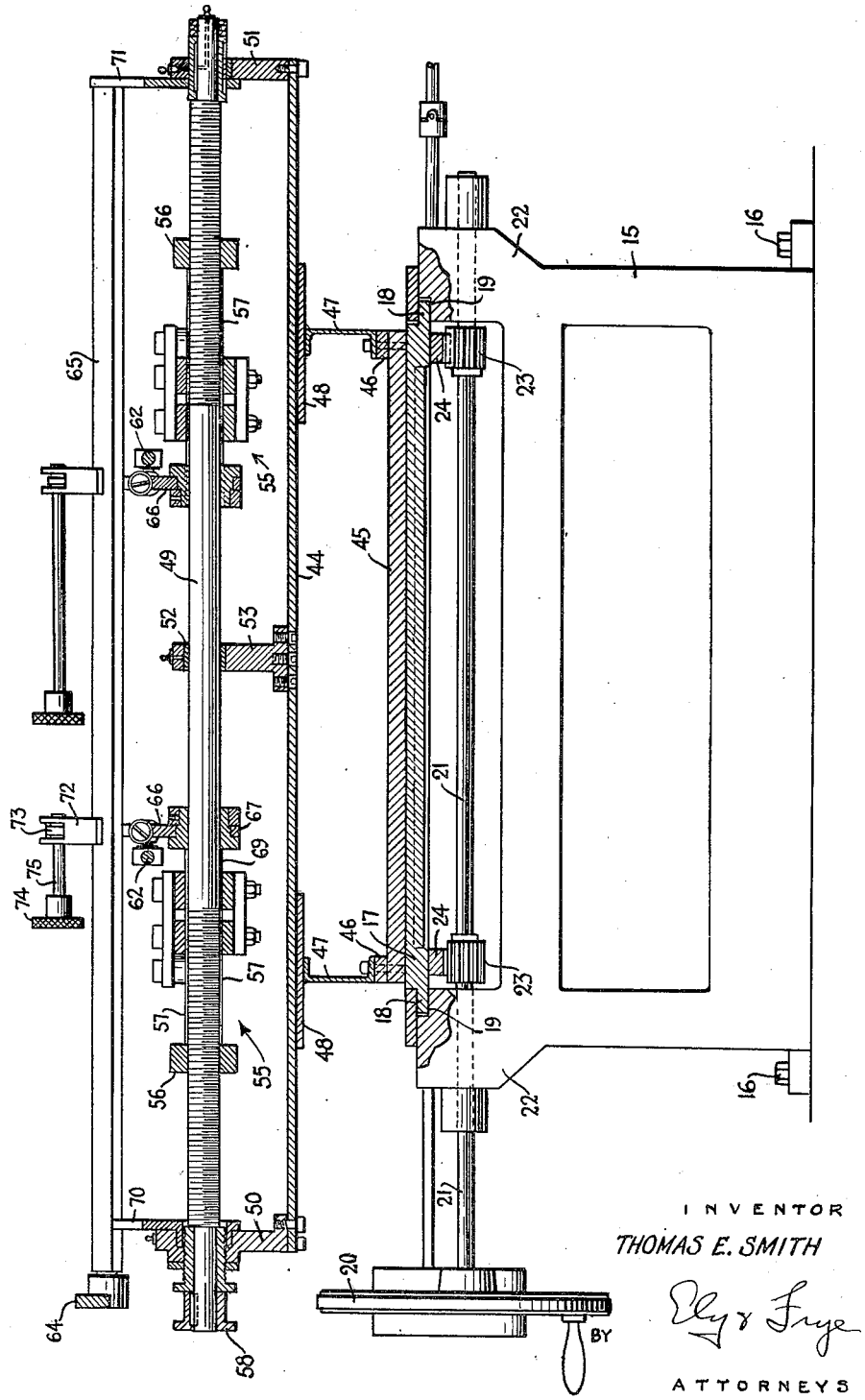

INVENTOR
THOMAS E. SMITH
BY
Ely & Frye
ATTORNEYS

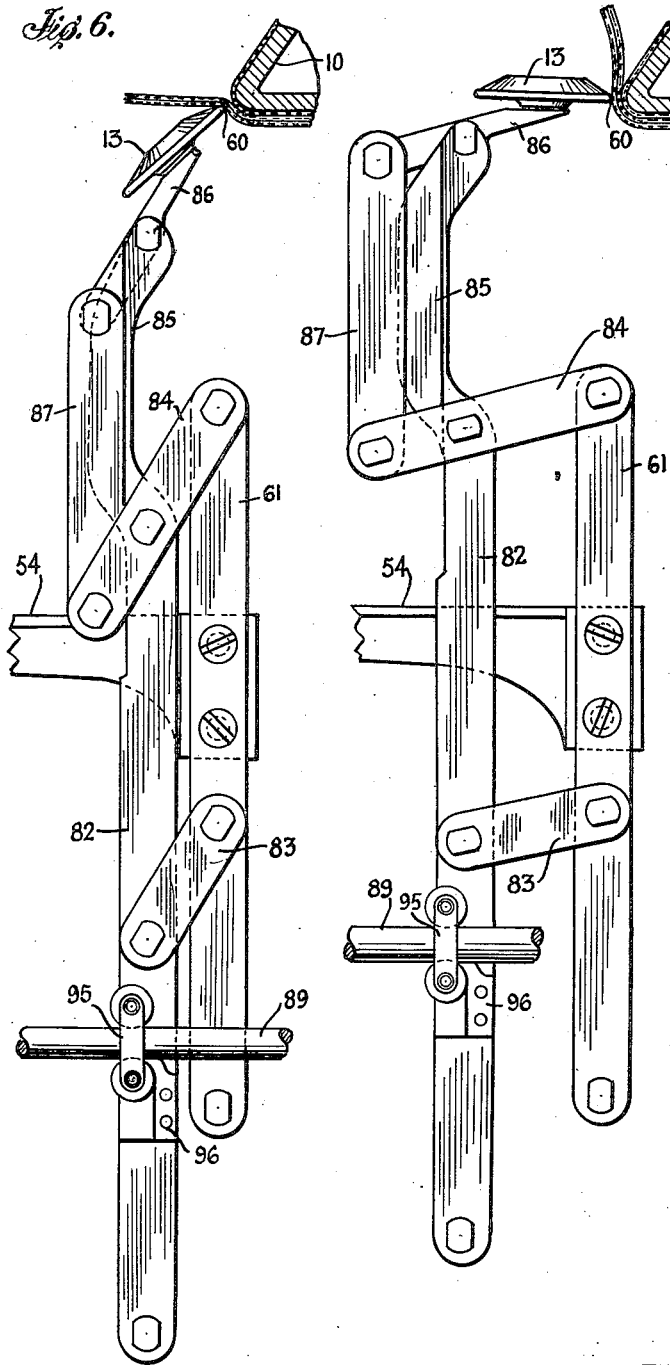

Jan. 9, 1951 T. E. SMITH 2,537,649
TIRE-BUILDING APPARATUS
Filed Sept. 2, 1948 6 Sheets-Sheet 5

INVENTOR
THOMAS E. SMITH
BY
ATTORNEYS

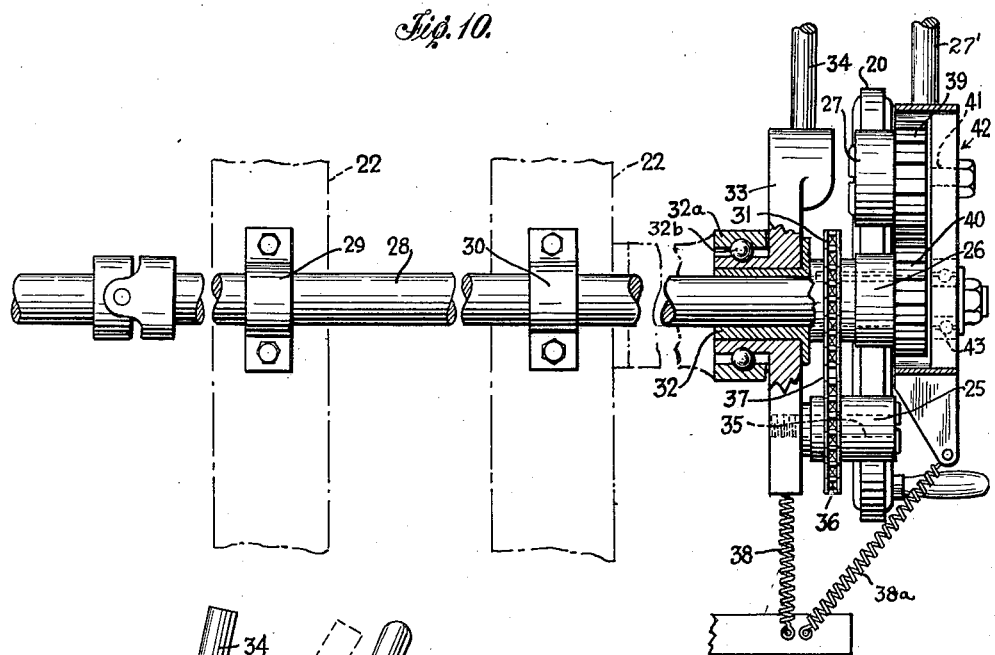

Patented Jan. 9, 1951

2,537,649

UNITED STATES PATENT OFFICE 2,537,649

TIRE-BUILDING APPARATUS

Thomas E. Smith, Akron, Ohio, assignor to The Firestone Tire & Rubber Company, Akron, Ohio, a corporation of Ohio Application September 2, 1948, Serial No. 47,349

15 Claims. (Cl. 154—10)

This invention relates to a tire-building apparatus and more especially it relates to stitching mechanism for operating upon the fabric plies of a tire casing after said plies have been applied to a rotatable tire-building form or drum.

The apparatus is more particularly designed for operative association with tire-building drums of the shoulder type or other form of tire-building drum having rounded and sometimes undercut end faces around and on which the tire plies are stitched. Stitchers embodying the present invention are equally well adapted for use in building large or small tires, tires of single or plural bead constructions, and tires having pliable plies of thin gauge fabric or relatively stiff plies of thick gauge.

In the method of manufacturing tires on building drums having shoulders, the bead portions of the tires are originally placed in substantially the same position they occupy in the completed tire in order to prevent the beads from becoming twisted or deformed during the shaping of the tire band to conventional tire shape. Accordingly the tire-building drums are often formed with obliquely undercut end faces upon which the bead portions of the tire are built. The tire-building fabric is applied to the drum in strips or bands that are transversely flat and extend well beyond the lateral margins or shoulders of the drum so as to be capable of being folded radially inwardly about said margins of the drum and thus to be laid upon the undercut sides thereof, either over or under the bead cores thereon as the case may be. Usually such folding of the fabric plies is effected concurrently upon two or more fabric plies. While the stitchers constituting the present invention have been shown relative to their manipulation in stitching the plies of a shoulder-drum-built tire, it is to be understood that such showing is for illustrative purposes only and that said stitchers are adapted for use in building tires on other type tire-building cores or forms.

As will be understood by those familiar with the art of tire-building, the marginal edges of the tire plies are folded about the beads in various ways in order to get a satisfactory bead tie-in. For example, some of the plies which lie under the bead have their edge portions turned axially outwardly against the base of the beads of the tire, and in some cases such turned margin may be further folded over the corner of the bead and extend radially outwardly along the sides of the beads. Other plies under the bead may be trimmed blind at the toe thereof. In similar fashion plies over the beads may be trimmed blind at the corner of the beads or extended along the base portion of the bead to the toe thereof. In some cases the plies over the beads extend to the toes of the tire bead and are so extended as to turn under the toes of the beads. It is desirable that the ply stock about the beads of a tire be free of wrinkles and firmly stitched into position. However, at best this is a tedious and expensive operation.

Heretofore mechanical stitchers have been employed to do some of the stitching of the ply stock about the tire beads, but such prior stitchers have not made it possible for a tire builder to dispense with considerable hand stitching or paddling of the ply stock in working it about the beads. The same is true of stitching the ply stock over the rounded shoulder of the tire-building drum. Heretofore the fundamental reason that satisfactory working of the ply stock over round shoulders, about corners and onto slanting surfaces could not be accomplished has been that the angle of the plane of rotation of the stitchers could not be progressively changed. Thus in stitchers heretofore known, turn-ups and turn-downs of plies have had to be carefully paddled as the stitchers could not be set at the proper angle for such operation. Because of the inflexibility of the prior stitchers the attempted use on work about the tire beads often resulted in wrinkled plies and in chaffing and skimming the rubber from the fabric of the ply.

It often happens that the tire-building drum of a tire-building machine is in a slightly off-center position relative to the stitchers. When this condition exists the stitchers of the prior art could not be adjusted by the machine operator to compensate for the off-center position of the building drum, consequently since satisfactory stitching could not be done under such condition the building machine had to be out of operation until a machinist centered the drum. This centering requires considerable time. Accordingly, one object of the present invention is to provide tire-building stitchers that may be easily adjusted to proper position to operate on an off-center drum.

Tire-building machines are commonly built to accommodate two or more sizes of building drums whereby different size tires may be built on a machine by changing the drums. Heretofore the adjustment of the stitchers, when a different size building drum was installed, required the service of a maintenance man and involved both time and the uncertainty of exact adjustment. When such stitchers were not properly spaced and adjusted their use often resulted in an inferior tire. Another object of the present invention is to provide stitchers which may be readily adjusted to tire-building drums of different sizes.

The stitchers of tire-building machines of the prior art, as far as applicant has been able to learn, could be locked in a limited number of operative positions, three for example, defining three values of the angle of the plane of rotation relative to the work. There could be no progressive change from one fixed position to another. A principal object of the present invention is, therefore, to eliminate said stitcher locking means and to provide, instead, manually operated means whereby the angle of the plane of rotation of the stitchers of a tire-building machine, which plane passes through the point of contact of said stitchers with the work, may be progressively changed so as to meet said work at a right angle to the surface thereof and maintain such relation thereto as the stitchers are worked around the shoulders of tire-building drums and the corners of tire beads.

When it was necessary to change the stitchers of tire-building machines heretofore used, from one fixed position to another, it was necessary for the operator to walk around the machine to the opposite side to adjust the stitcher on that side. Another object of the present invention is to provide such pairs of stitchers that can be adjusted by one manually operated lever.

Many tire constructions involve turning certain plies, or chafers under the toe of the tire beads. This has entailed hand work since the stitchers of the prior art were not adapted to stitch over the shoulders of a building drum and also to be turned to a proper angle to turn the marginal edges of a tire ply under at the toe of the tire bead. A further object of the present invention is to provide a stitcher adapted to the ply stock over the entire surface of the ply in its assembly into a tire body including turn-under plies.

In tire stitchers of the type requiring locking in selected positions the stitching operation must be discontinued during the changing from one selected position to another. A still further object of the present invention is to provide tire stitchers that may have the angle of the plane of rotation changed during a stitching operation.

Tire stitchers of the prior art were so pivoted relative to the beads of a tire that when the stitchers reached the corner of the tire beads the stitchers would move directly from the corner to the toe of the tire bead. This arrangement resulted in the stitchers in operation "jumping" or "falling" across the base of the tire bead. Yet another object of the present invention is to provide stitchers so pivoted relative to beads of a tire that the stitchers normally move radially outwardly against the base of the beads of a tire as the stitchers travel across such beads toward the toe thereof.

According to the present invention, it is proposed to provide a machine carriage which is slidably movable on its base toward and away from a shoulder-type collapsible tire-building drum rotatably mounted on a driven horizontal collapsible spindle.

Another purpose of the invention is to mount, in threaded relation therewith, tire stitchers on opposite ends of a bar having oppositely threaded ends. This bar is mounted on the machine carriage and is disposed transversely of the tire-building drum and provides a medium through which the stitchers may be caused to travel concurrently toward each other, or concurrently away from each other, the assembled stitchers to concurrently shift axially of the work in the same direction through the medium of an externally threaded nut.

A further purpose is to provide means, mounted on the machine carriage, comprising a plurality of pivotally connected arms adapted to progressively change the plane of rotation of the tire stitcher independent of the movement of the machine carriage whereby said plane can be revolved about a given point, such as, for example, a point on the ply of a tire being stitched.

A still further purpose of the invention is to provide means mounted on said carriage for advancing and withdrawing said stitchers relative to said drum.

It will now be seen that by the accomplishment of the stated purposes the invention provides a tire stitcher having universal adjustment relative to the surface of a tire upon which work is being done. Other objects and purposes of the invention will be manifest as the description proceeds.

In the accompanying drawings, the invention has been shown merely in preferred form and by way of example, but obviously many changes or variations may be made therein and in its mode of operation which will still be comprised within its spirit. It should therefore be understood that the invention is not limited to any specific form or embodiment except in so far as such limitations are specified in the claims.

Of the accompanying drawings:

Fig. 1 is a top plan view of one end of the machine embodying the present invention showing one position of a stitcher relative to the work;

Fig. 2 is a top plan view of the opposite end of the machine shown in Fig. 1 showing a stitcher in another position relative to the work;

Fig. 3 is a section on line 3—3 of Figs. 1 and 2;

Figs. 6 and 7 are diagrammatic views illustrating positions of a tire stitcher relative to its actuating arms;

Fig. 10 is a partial front elevation of the driving mechanism;

Fig. 11 is an end elevation of the mechanism shown in Fig. 10.

Figure 4:
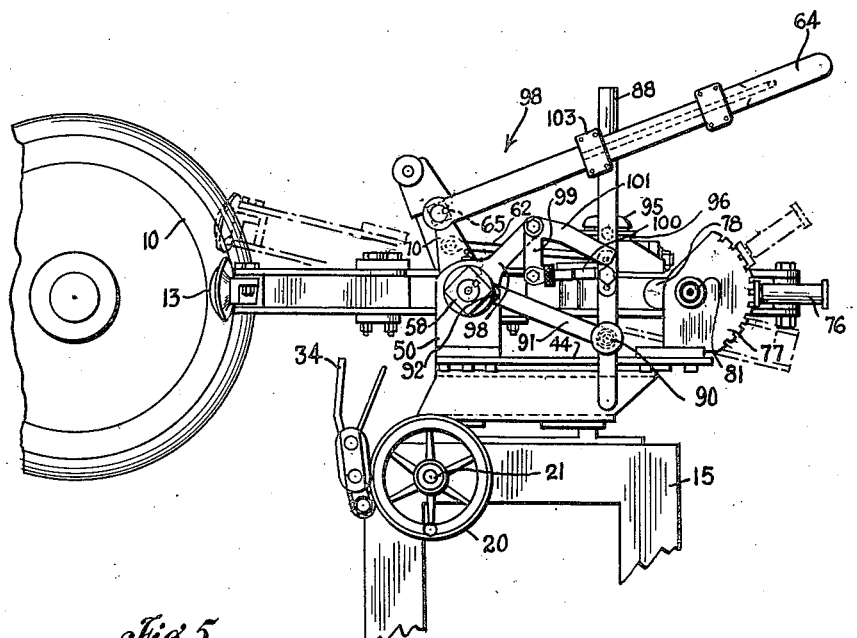
Fig. 4 is an end elevation of Fig. 1.
Figure 5:
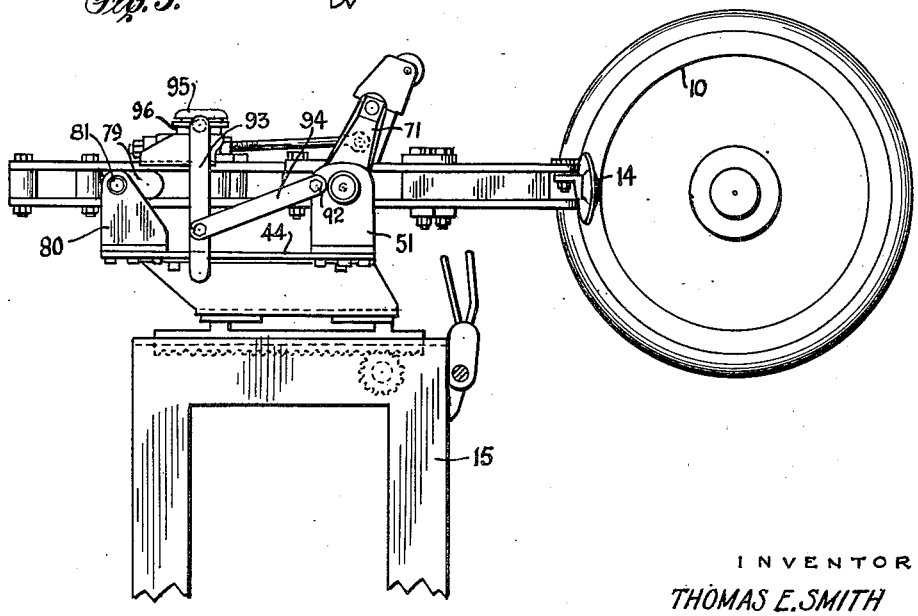
Fig. 5 is an end elevation of Fig. 2.

Referring to the drawings, there is shown a shoulder-type, sectional tire-building drum or form 10, of any known or preferred construction, such as is commercially used for the fabrication of pneumatic tire casings. The drum is mounted on the end of a horizontal spindle 11 associated with driving means 12. Since these latter form no part of the present invention they need not be described or illustrated in detail.

In general, the invention relates to means for positioning and manipulating the stitchers 13, 14. The possible motions comprise a motion in unison to or from the drum 10, a motion toward or away from each other on an arc in a generally horizontal plane and generally axial of the drum, a rocking in unison in an arc transverse to the axis of the drum, and a rocking of each about a point in space coinciding with a point on the periphery of each. The mechanism providing for each motion will be described separately.

The principal support for the stitcher mechanism is comprised by a base 15 bolted to the floor as at 16. Motion of the entire stitching mechanism to and from the drum 10 is provided for in a base plate or sleigh member 17 having shouldered portions 18 slidable on rabbeted portions 19 forming a track in the base 15. Motion of the sleigh 17 along the track 19 is effected manually by a hand-wheel 20 having a shaft 21 journalled in each of two upright arms 22 on the base 15 and carrying therebetween a pair of pinions 23 which are in mesh with racks 24 fixed to the underside of the sleigh 17. Turning of the hand-wheel thus effects sliding of the entire stitcher carriage along the ways 19.

MECHANISM FOR SLIDING THE TABLE

The hand wheel is used for rapid shifting of the table to and from the approximate position for the stitching operation, and in certain stitching operations. In general, however, progress of the table in the stitching operations is effected by a power means, as follows: Referring to Figs. 10 and 11, closely adjacent the periphery of the hand-wheel 20 are three small friction-drive wheels 25, 26, 27, all driven continuously by the main drive-means 12 through a shaft 28 journaled in brackets 29, 30 fixed near the ends of the uprights 22 on the base 15. Keyed at the end of the shaft 28 for rotation therewith are a sprocket wheel 31, the friction wheel 26 and a gear 40. The shaft 28 is eccentrically disposed in a bearing sleeve 32 in the bracket 30, and the sleeve is rotatable in the bracket by means of a lever 33 to which it is attached, the lever having a handle portion 34. The friction wheel 26 being normally very closely adjacent the periphery of hand-wheel 20, it will be seen that upon clockwise swing of the handle 34, as seen in Fig. 11, the axis of the shaft 28 near its right-hand end will be shifted toward the hand-wheel 20 and consequently the friction wheel 26 will be brought into peripheral engagement with the hand-wheel 20. This provides the "fast" feed as compared with the feed when friction wheel 25 is effecting the drive. The latter is keyed on a shaft 35 which is threadedly carried in a lower extension of lever 33. Also keyed to shaft 35 is a sprocket wheel 36, and a sprocket chain 37 engages both wheels 31 and 36 whereby friction wheel 25 is constrained to rotate constantly with friction wheel 26 and in the same direction. Thus, a shift of the handle 34 from one operating position to the other will effect an interchange of the driving wheels 25, 26 with a resultant change of speed without change of direction of rotation of the hand-wheel 20. A spring 38 maintains lever 33 in a position where neither of wheels 25, 26 is in engagement with the hand wheel. Therefore, the latter can normally be freely employed as desired.

A reversing friction wheel may also be employed. Such a wheel is shown at 27, being keyed to a common shaft 41 with a planetary gear 39 meshing with gear 40, the shaft 41 being carried by an arm shown generally at 42 in the form of a gear housing, and jouraled on the end of shaft 28 as by anti-friction means 43. Obviously friction wheel 27 will rotate at all times in a sense opposite to friction wheel 26 and may be presented at any time to the periphery of hand-wheel 20 by swinging arm 42 about shaft 28 by means of handle 27'. Thus, wheel 27 and associated mechanism provide a power means for reversing the direction of slide of the table relative to that effected by wheel 26. Of course means are usually provided for reversing the rotation of shaft 28, and in such case wheels 25, 26, 27 will each be reversed but will retain their relative directions of rotation, one to the others.

All motions of the stitchers other than translation of the stitcher apparatus as a whole to and from the drum, described above, are accomplished through various mechanisms (Fig. 3) supported on a platform 44 carried on sleigh 17 through a plate 45, spacers 46, channel beams 47, and plates 48. A shaft 49, which forms the principal anchoring element for the various stitcher-manipulating mechanisms, is rotatably carried in end uprights 50, 51 fastened to the platform 44, and is centrally supported in a bushing 52 in a standard 53, also fastened to the platform. Inasmuch as the mechanism is, in most respects symmetrically arranged on either side of the center of the platform, only one group will be described.

MUTUAL APPROACH AND RECESSION OF THE STITCHERS

The mutual approach and recession of the stitchers has been common to all machine stitchers of the prior art. This has been accomplished by outright translation of the stitcher-carriers. In the present machine, such motions are accomplished by swinging the stitcher-carriers about respective centers, as explained above. The linkwork carrying the stitcher, later to be described, is pivotally anchored to the shaft 49 through a link 54 which is pivoted at 59 to one end of a generally tubular rider shown generally at 55. The rider is threaded internally at 56 on one end for engagement with the threaded portion of shaft 49, and has central upper and lower flat portions 57 to accommodate the link-work, and are spaced apart slightly more than the diameter of shaft 49 in order to protect the threads from contact with the link-work. It will be seen that upon turning of the shaft 49, as by application of a wrench to nut 58 on the end thereof, the rider 55 and link 54 and all of the mechanism carried thereby will be moved bodily in a direction axially of shaft 49. The two halves of shaft 49 being oppositely threaded, the pair of stitchers will either approach each other or diverge, as the case may be, for adjustment to a given length of drum.

The exact position of the working point 60 on the periphery of the stitcher is controlled at all times by the link 61 which is rigid with the link 54. In fact, as will appear from an analysis of the parallelogram linkage, the point 60 is effectively as much a part of the link 61 as if the link were extended and connected thereto. Thus, point 60 always remains at a fixed distance from the axis of pivot 59 and will move through equal angles with the link 54. In order, therefore, to move the working points 60 toward each other in an arcuate movement, it is only necessary to move the link 61 about the pivot 59. This is accomplished through a rod 62 attached to link 61 through a portion 63 integral therewith. The force to move the link 61 is communicated to rod 62 through a handle 64 keyed to a square shaft 65 which transmits thrust through a crank arm 66 journaled on a reduced portion 67 on the inner end of the rider 55, which crank arm bears a socket 68 receiving a ball 69 on the rod 62 for universal movement. The shaft has properly journaled crank arms 70, 71 at its ends for purposes of support and stability. From the foregoing it will be clear that as the handle 64 is swung, the link 61, and hence point 60, will swing about the pivot 59. Any operation of the parallelogram linkage during this movement will not vary the arc in which the point 60 moves.

The crank arm 66 is turned by the square shaft 65 through a wrench member 72 slidably carried on the upper end of the crank arm. The crank arm is raisable by means of a cam 73 rotatable through a hand knob 74 on a shaft 75 in order to disengage either stitcher as desired. The equivalent member to the right of center in Fig. 3 has a longer shaft for convenient reaching by the operator, who normally stands to the left of the assembly as shown in this figure.

TILTING OF THE STITCHERS

Tilting of the rider 55, and hence stitcher-carrying parallelogram linkages about the shaft 49, is accomplished by a lever 76 journaled coaxially with a toothed sector 77 fastened to the platform 44. The lever 76 carries a spring-pressed catch for locking it in selected angular position on the toothed sector. Lever 76 has a short arm 78 (Fig. 4) extending beyond the center of the toothed sector, and fixed to said short arm, and extending across the platform 44 to a similar short arm 79, which is journaled in an upright bracket 80 on the platform, is a shaft 81 passing between the upper and lower members of the parallelogram linkage, presently to be described. Upon angular displacement of the handle 76, the linkage is urged through an angular displacement of a magnitude depending upon the length of arms 78, 79 and the stitcher point 60 correspondingly revolves, about the axis of shaft 49, through an arc in a generally vertical direction. These positions constitute normal settings for a given stitcher operation and will not usually require adjustment during the coursing of the stitcher.

THE PARALLELOGRAM LINKAGE

Adjustment of stitcher angle

Figure 8:
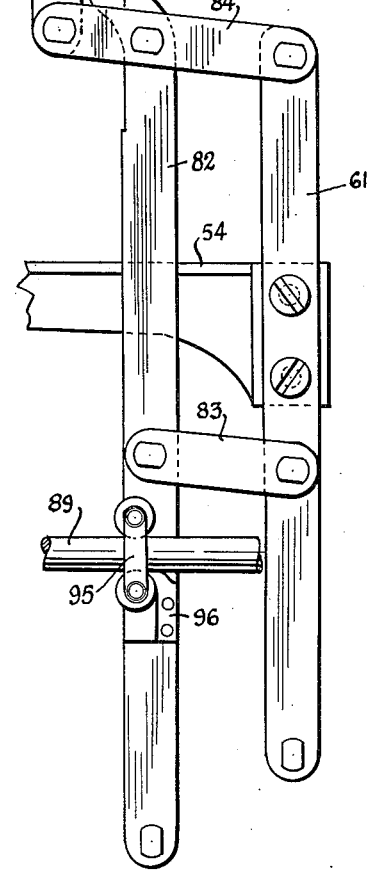
Fig. 8 is a similar view to Fig. 7 but showing the stitcher in a more advanced position.
Figure 9:
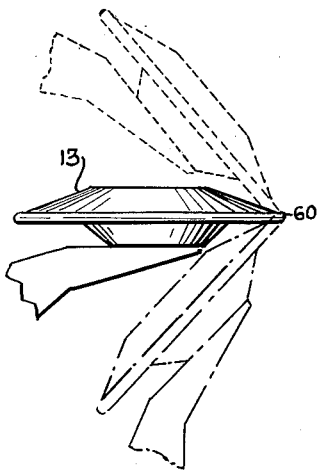
Fig. 9 is a diagrammatic view illustrating the movement of a stitcher at its point of contact with the work.

In the novel elements of the apparatus about to be described, an intersection of the periphery of each stitcher with a fixed, generally horizontal plane through the stitcher apparatus, remains at a fixed point in space while the angles of the stitchers are varied. In other words, a diameter of the stitcher revolves about one of its extremities which is fixed in space. This is accomplished by a parallelogram linkage shown generally in association with other parts of the whole apparatus in Figs. 1 and 2 and in enlarged detail in Figs. 6, 7 and 8.

Referring to Figs. 1 and 2 for an understanding of the linkage in its relation to the apparatus as a whole, attention is again directed to the fact that the link 61 is carried by the link 54 and is irrotative relative thereto. A link 82 is maintained parallel at all times to link 61 by a short cross-link 83 pivoted to each and a portion of a cross-link 84 to which it is intermediately pivoted so as to afford an effective length or distance from link 61 equal to the effective length of link 83. The portions of links 61, 82, 83, 84 lying between the pivot points thus constitute a parallelogram of variable angle, and which may be termed the principal parallelogram. Link 82 has an extension 85 with an end cross-link 86 pivoted on a line with the other two pivots of link 82. Obviously, if link 61 were extended and pivoted to cross-link 86, such pivot point would move or remain stationary in space accordingly as the other two pivots in link 61 so behaved. However, this is the point 60 mentioned above, the working-point of the stitcher and therefore the inclusion of a link and pivot are prohibited. The same result, however, is accomplished by means of a complementary parallelogram. To effect this a link 87 is pivoted to extensions on links 84 and 86 so as to remain in parallelism with the effective line of link 82. It follows as a consequence that link 86 will remain parallel to link 84 and therefore the distance between point 60 and the nearermost pivot of link 61 remains constant. That is to say, if the said pivot remains fixed in space, or, more specifically, in the plane of the parallelogram, so also does the point 60. Thus, motion of the link 82 in its own longitudinal direction, as controlled by the angular motion of links 84 and 83 about their pivotal connections with link 61, effects turning of the stitcher about the point 60 without effecting any movement of the point 60 in space. Any such latter movement of the point 60 is controlled by the various control units discussed above, and the parallelogram may be operated alone or concurrently with any of such other controls.

The linkage is operated by means of a lever 88 carrying a rod 89 to constitute a second-class lever. As seen in Fig. 4, the lever is fulcrumed at its pivotal connection 90 with an arm 91 which is in turn pivoted at 92 to the upright 50. A similar set of links 93 and 94 are likewise connected to upright 51 on the other end of the apparatus. The weight of the rod 89 and the control links is supported on top of the parallelogram linkage, and the driving connection for the link 82 is provided by a cage 95 carried by a base 96 fixed to the link 82. Due to the arcuate movement of the link 82 as a whole about the pivots in link 61, anti-friction rollers 97 are provided in the cage 95.

AUTOMATIC OPERATION OF THE LINKAGE

The mechanism for coordinating mutual approach of the stitchers with the independent orientation of the stitchers will now be described. As best seen in Fig. 4, an extension 98 on the upright 50 pivotally carries a bell-crank lever, one arm 99 of which is pivotally attached to a tie-rod 100, the other end of which is pivotally attached to the lever 88 which controls the parallelogram linkage. The other arm 101 of the bell-crank is positioned to be engaged by a lug 102 carried by a slidingly adjustable member 103 on the hand lever 64. Assuming the position of the stitcher to be as shown in Fig. 1, in order to work the plies around the inner bevelled edge 104 of the drum 10, the operator will advance the stitchers by means of hand lever 34 while bearing down on hand lever 64 to maintain a pressure urging the stitchers toward the center of the drum by revolution about pivot 59. The arm 101 of the bell-crank should be positioned to be engaged by the lug 102 shortly after contact of the stitchers with the unfolded plies. As a result, the motion of the stitchers toward the axis of the drum and thence inward toward the center thereof, to negotiate the rounded edge, is accompanied by a turning of the planes of the stitchers to maintain substantially a radial attitude to the curvature of the surface throughout. After the curved edge is negotiated, the lug 102 will leave the arm 101 of the bell-crank, and thereafter the stitchers maintain a constant angle appropriate to the substantially straight profile of the bevelled annulus 104. Obviously, the manner of engaging the bell-crank or other suitable connecting means may be designed to adapt the angle of the stitchers to any shaped surface forming a backing for stitching of the plies.

Whereas the separate operation of the mechanism to revolve the stitchers about the pivot 59 will tend to effect some variation in the parallelogram linkage due to its anchorage on the rod 89, such tendency is offset by the fact that handle 76 is free to move.

It is believed that from the foregoing description the complete operation of the machine will be clear to those skilled in the art. While a certain preferred embodiment has been shown, obviously the invention is not to be deemed as so limited, and details of construction may be varied within wide limits without departing from the spirit and scope of the invention.

What is claimed is:

1. An apparatus comprising a tire-building drum, a stitching tool, a platform mounting the stitching tool and movable bodily toward and away from the axis of the drum, means mounting the stitching tool on the platform and providing for translation of the tool as a whole axially of the drum, means on said first-mentioned means articulating the stitching tool as a whole thereto for arcuate movement generally axially of the drum and independently of either of said other movements, and means associated with the stitching tool for varying the angle thereof with the drum throughout a continuous range of adjustment independently of any other motion in the system, and said last-mentioned means including means for maintaining the working point of said stitcher tool at a constant distance from a fixed point in said second-mentioned means at all angular positions of the stitcher tool.

2. An apparatus comprising a tire-building drum, a stitching tool, a platform mounting the stitching tool and movable bodily toward and away from the axis of the drum, means mounting the stitching tool on the platform and providing for translation of the tool as a whole axially of the drum, said means including means providing for revolution of said stitching tool as a whole about a line parallel to the direction of said translation, and means associated with the stitching tool for varying the angle thereof with the drum throughout a continuous range of adjustment independently of any other motion in the system, and said last-mentioned means including means for maintaining the working point of said stitcher tool at a constant distance from a fixed point in said second-mentioned means at all angular positions of the stitcher tool.

3. An apparatus comprising a tire-building drum, a stitching tool, a platform mounting the stitching tool and movable bodily toward and away from the axis of the drum, means mounting the stitching tool on the platform and providing for translation of the tool as a whole axially of the drum, means on said latter means articulating the tool as a whole thereto for arcuate movement independently of either of said other movements, said first-mentioned means including means providing for revolution of said stitching tool as a whole about a line parallel to the direction of said translation, and means associated with the stitching tool for varying the angle thereof with the drum throughout a continuous range of adjustment independently of any other motion in the system, and said last-mentioned means including means for maintaining the working point of said stitcher tool at a constant distance from a fixed point in said second-mentioned means at all angular positions of the stitcher tool.

4. In a tire-building machine, a tire-building drum and a stitcher, means mounting the stitcher for movement axially and transversely of the drum, and means for varying the angle of the stitcher with the drum independently of any motion of the point of contact of the stitcher with the drum said last-mentioned means including means for maintaining the working point of said stitcher tool at a constant distance from a fixed point in said second-mentioned means at all angular positions of the stitcher tool.

5. In a tire-building machine, a tire-building drum and a stitcher, means mounting the stitcher for movement axially and transversely of the drum, and means for varying the angle of the stitcher with the drum independently of any motion of the point of contact of the stitcher with the drum, said latter means comprising a double, parallelogram linkage arranged in tandem on opposite sides of a common, median line.

6. For use with a tire-building machine, in combination, a stitcher and a mounting therefor, said mounting comprising a linkage having a central main link, parallelograms in tandem on opposite sides of the main link, each having a side coinciding with the main link and each also having a side coinciding with a line transversely of said main link, said stitcher being mounted on an extension of a side of one of said parallelograms on the opposite side of the main link therefrom.

7. In combination, the stitcher and mounting of claim 5 and a stitcher platform having an arm articulated thereto for motion generally in a plane parallel to the plane of the platform, and one side of one of said parallelograms being rigidly fixed to an outer portion of said arm.

8. In combination, a tire-building drum, a platform, means mounting a stitcher on the platform for bodily motion of its point of contact with the drum in a plurality of directions, and means for varying the angle of the stitcher with the drum independently of any of said motions said last-mentioned means including means to hold the said point of contact at a constant distance from a fixed point in said mounting at all angles of the stitcher.

9. For use in a tire-building machine, a platform, a stitcher, and a mounting therefor comprising a member connected to the platform, means carrying the stitcher and connected to said member and constructed and arranged to vary the angle of the stitcher independently of any other movement in the machine, said means including means for maintaining a working point of said stitcher at a fixed distance from a fixed point in the said member.

10. For use in a tire-building machine, in combination, a platform, a link connected to said platform and adapted to be maintained in fixed position relative thereto, a second link articulated to said first link for swinging motion while remaining parallel thereto, a stitcher carried by the second link, and means for varying the angle of the stitcher in response to motion of the second link, said means including means for maintaining the working point of the stitcher at a fixed distance from a fixed point in the said first link.

11. A mounting for a stitcher for a tire-building machine, comprising a first link, a second link articulated to said first link by a pair of arms of equal length, an extension on one of said arms, a third link articulated to said extension, an arm articulated to said third link and to an extension on said second link an extension on the latter mentioned arm on the opposite side of the said second link, and a stitcher mounted on the last-mentioned extension.

12. An apparatus comprising a tire-building drum, a platform mounted for movement transversely of the axis of the drum, a carriage on the platform arranged for motion parallel to the axis of the drum, a first link, a radius arm fixed to said first link and articulated to said carriage, a second link bearing a stitcher tool, and articulating means connecting said second link to said first link, said articulating means being freely movable independently of any other movement in the apparatus and being constructed and arranged for swinging motion of said second link while maintaining the working point of said stitcher tool at a constant distance from a fixed point in said first link.

13. An apparatus comprising a tire-building drum, a stitching tool, a platform mounting the stitching tool and movable bodily toward and away from the axis of the drum, means mounting the stitching tool on the platform and providing for translation of the tool as a whole axially of the drum, means on said first-mentioned means articulating the stitching tool as a whole thereto for arcuate movement generally axially of the drum and independently of either of said other movements, means associated with the stitching tool for varying the angle thereof with the drum throughout a continuous range of adjustment, said last-mentioned means including means for maintaining the working point of said stitcher tool at a constant distance from a fixed point in said second-mentioned means at all angular positions of the stitcher tool, and means for operating the third-mentioned means in response to movement of the second-mentioned means.

14. A machine as in claim 5, said last-mentioned means being attached to said mounting means through one link only of said linkage.

15. In combination, the stitcher and mounting of claim 11 and a stitcher platform having an arm articulated thereto for motion generally in a plane parallel to the plane of the platform, and one side of one of said parallelograms being rigidly fixed to an outer portion of said arm.

THOMAS E. SMITH.

REFERENCES CITED

The following references are of record in the file of this patent:

UNITED STATES PATENTS

| Number | Name | Date |
| --- | --- | --- |
| 1,319,333 | Harsel | Oct. 21, 1919 |
| 1,338,407 | Templeton | Apr. 27, 1920 |
| 1,462,465 | Trogner | July 17, 1923 |
| 2,161,117 | Wikle | June 6, 1939 |
| 2,488,340 | Shook et al. | Nov. 15, 1949 |